US008549134B1

(12) United States Patent
Gravel et al.

(10) Patent No.: US 8,549,134 B1

(45) Date of Patent: Oct. 1, 2013

(54) NETWORK EVENT INDICATOR SYSTEM

(75) Inventors: Mark Gravel, Roseville, CA (US); Alan Albrecht, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2295 days.

(21) Appl. No.: 11/055,593

(22) Filed: Feb. 11, 2005

(51) Int. Cl.
*G06F 15/173* (2006.01)

(52) U.S. Cl.
USPC .......... 709/224; 709/223

(58) Field of Classification Search
USPC .......... 709/223, 224, 232, 238; 370/445, 370/448
See application file for complete search history.

(56) References Cited

U.S. PATENT DOCUMENTS 5,651,123 A * 7/1997 Nakagawa et al. .......... 712/208
6,061,742 A * 5/2000 Stewart et al. .......... 709/250
6,073,103 A * 6/2000 Dunn et al. .......... 704/276
6,108,367 A * 8/2000 Herman et al. .......... 375/141
6,128,310 A * 10/2000 Chow et al. .......... 370/448
6,185,433 B1 * 2/2001 Lele et al. .......... 455/528
6,223,286 B1 * 4/2001 Hashimoto .......... 713/178
6,288,739 B1 * 9/2001 Hales et al. .......... 348/14.07
6,446,119 B1 * 9/2002 Olah et al. .......... 709/224
6,483,849 B1 * 11/2002 Bray et al. .......... 370/465
6,757,531 B1 * 6/2004 Haaramo et al. .......... 455/414.1
6,772,018 B2 * 8/2004 Juntunen et al. .......... 700/24
6,996,344 B1 * 2/2006 Caidar et al. .......... 398/141
7,030,737 B2 * 4/2006 Dove et al. .......... 340/331
7,046,993 B2 * 5/2006 Haaramo et al. .......... 455/414.4
7,865,178 B2 * 1/2011 Haaramo et al. .......... 455/414.1
2002/0019954 A1 * 2/2002 Tran .......... 713/600
2002/0070846 A1 * 6/2002 Bastian et al. .......... 340/5.92
2003/0018398 A1 * 1/2003 Juntunen et al. .......... 700/24

OTHER PUBLICATIONS

Versitron Product Manuals Resource S7085x Fast Ethernet Switch Instillation Guide copy right Jan. 2003.□□□□http://www.fiberopticmodems.com/s7085x.html.*

* cited by examiner

*Primary Examiner* — Sargon Nano

(57) ABSTRACT

A network event indicator system and corresponding method are described. The system includes an event rate classifier and an indicator drive state machine. The event rate classifier receives an event signal representing timing of a network event during a predetermined sample period and transmits an event rate signal. The indicator drive state machine receives the event rate signal and generates a drive indicator signal based on the received event rate signal.

20 Claims, 2 Drawing Sheets

NETWORK EVENT INDICATOR SYSTEM

FIELD OF THE INVENTION

The present invention relates to a network event indicator system.

BACKGROUND

Networks transfer information between two or more attached devices, e.g., a network of computers communicating with one another over a shared network medium. Local area networks (LANs) and wide area networks (WANs) are two of many different types of networks. A network medium, e.g., cables (wired) or radio frequency transceivers (wireless), etc., connects together the network devices. Network components such as hubs, bridges, transceivers, and routers each add functionality to a network and many may include high-speed processors and switching devices to manage network traffic. Network traffic includes the transmission and receipt of data and information between devices using the above-described network.

Network administrators monitor network performance, network traffic level, and any network problems using network activity indicating devices. For example, light emitting diodes (LEDs) are illuminated at varying rates based on input from associated network devices. For example, a level of network activity may be indicated by a rate at which the LEDs flash.

Prior networking devices indicate network events to users by illuminating the LED for a specified period of time (an ON time) followed by extinguishing the illuminated light for another specified period of time (an OFF time) based on information received from a processor, e.g., a central processing unit. For example, according to one prior approach, an LED is illuminated for 5 milliseconds (ms) for each network event count sampled by the processor. In detail, the processor reads control and status registers of a media access controller, which is responsible for handling network events, of the network device on a periodic basis in order to determine activity counts for network events. Subsequently counted network events cause the LED to continue being illuminated for an additional 5 ms. Disadvantageously, the flicker caused by illuminating and extinguishing the LED does not reflect actual network events due to the stretching of the illumination due to sequentially received and counted network events which are more closely spaced than the specified period of "illumination" time for the LED. Further, processor time is used sampling the media access controller to obtain network event counts. E.g., the processor periodically polls network event counters.

Further disadvantageously, the LED is constantly illuminated at very low network event rates. For example, recurring events at a period of 5 ms or less cause the LED to indicate activity continuously on a 1,000 megabits per second (Mb/s) network link at 0.0164% utilization of the network link bandwidth.

Prior approaches fail to scale in accordance with the speed of the network link, e.g., 10 Mb/s, 100 Mb/s, 1,000 Mb/s, etc.

SUMMARY

The present invention provides a network event indicator system.

An apparatus aspect includes a network event indicator system having an event rate classifier for receiving an event indicator representing timing of an event and for transmitting an event rate signal and an indicator drive state machine connected to the event rate classifier for receiving the event rate signal and driving an indicator based on the received event rate signal.

A method aspect includes receiving an event signal representing timing of a network event during a predetermined sample period. An event rate signal based on the received event signal is generated and the event rate signal is determined based on a relationship between the event signal timing and the predetermined sample period. An indicator signal based on the event rate signal is generated.

Still other advantages of the embodiments will become readily apparent to those skilled in the art from the following detailed description, wherein the preferred embodiments are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In contrast with the above-described approaches, the mechanism of the present invention provides a network event indicator system.

Figure 1:
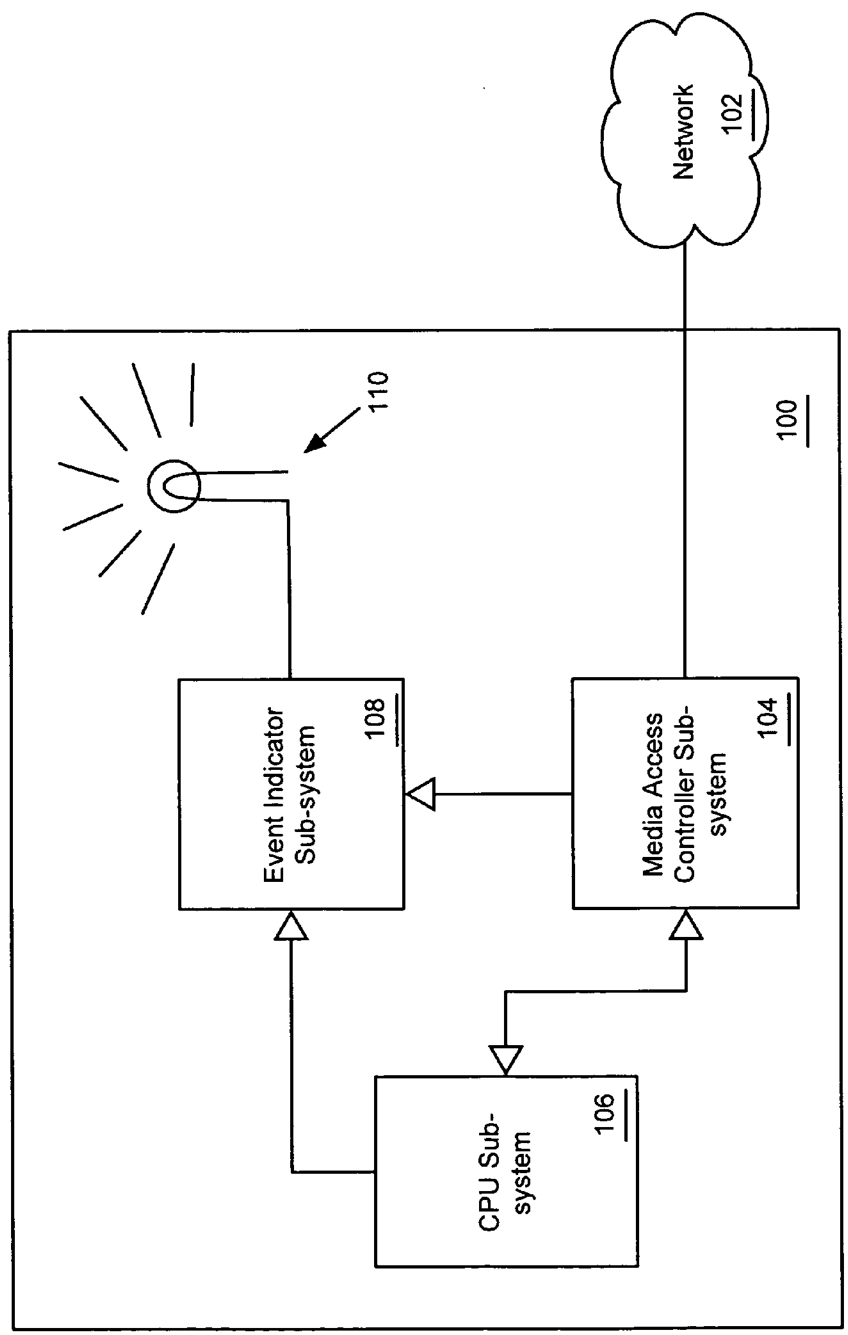
FIG. 1 is a high level block diagram of an embodiment.

FIG. 1 is a block diagram of a network component 100, e.g., a switch, hub, router, etc., and includes functional elements of the network component related to determining and displaying a network activity level. Network component 100 includes a media access controller (MAC) sub-system 104, a central processing unit (CPU) sub-system 106, an event indicator sub-system 108, and an indicator device 110 (sometimes referred to as an LED, which is a type of an activity level indicator). Event indicator sub-system 108 receives event signals, e.g., receive traffic event, transmit traffic event, error events, etc., from MAC sub-system 104, classifies the received event signals, and generates a signal to drive indicator device 110 for a specified ON and OFF time. That is, event indicator sub-system 108 receives a signal from MAC sub-system 104 for the duration of each event, i.e., receive events, transmit events, and error events. In an embodiment, MAC sub-system 104 begins transmission of the signal to event indicator sub-system 108 upon detecting a receive event, a transmit event, and an error event and ends transmission of the signal to the event indicator sub-system upon detecting termination of the receive event, the transmit event, and the error event.

Event indicator sub-system 108 samples event signals received from MAC sub-system 104 for a predetermined sample period, e.g., 400 milliseconds (ms), and classifies the activity level during the predetermined sample period according to a specified event classification grouping. Event indicator sub-system 108 generates a signal driving indicator device 110 for a specified ON and OFF time determined based on the event classification grouping of the predetermined sample period activity level. Further, event indicator sub-system 108 receives a saturation indication signal from CPU sub-system 106 causing event indicator sub-system 108 to drive indicator device 110 to illuminate for the entire predetermined sample period if the determined event classification grouping is saturation. In contrast, if event indicator sub-system 108 does not receive the saturation indication signal, the event indicator sub-system drives indicator device 110 to illuminate for a predetermined ON time and turn off for a specified OFF time during the predetermined sample period if the determined event classification grouping is saturation. Each of the above components is now described in detail below.

MAC sub-system 104 interacts with and monitors traffic on and to/from network 102. MAC sub-system 104 in conjunction with CPU sub-system 106 handles traffic on network 102. Network 102 is a connection between two or more networked devices, e.g., a LAN, a WAN, etc., as described above. In differing embodiments, network 102 may be a wired connection, a wireless connection, or combination of wired and wireless connections.

CPU sub-system 106 is part of the processor controlling the network component 100, and generally includes a processor, RAM, ROM, and application and/or operating system programs stored in a memory (not shown). An indicator device 110 is provided for each network connection of network component 100 being monitored, and is coupled to and driven by event indicator sub-system 108. A network component with one hundred network connections would typically have one hundred activity-level indicators, one assigned to each network connection. In alternative embodiments, more than one network connection may be associated with an activity-level indicator. For simplicity and ease of understanding, only a single indicator device 110 and a single network connection are depicted and described with reference to FIG. 1.

Event indicator sub-system 108 monitors event signals from MAC sub-system 104 for a predetermined sample period and drives indicator device 110 for a specified ON and OFF time based on classification of the number of event signals during the sample period. In an embodiment, event indicator sub-system 108 includes hardware logic components configured to provide the described functionality. In an alternate embodiment, event indicator sub-system 108 includes firmware or application specific integrated circuit (ASIC) logic components. In contrast with previous event indication approaches, embodiments according to the present invention need not require operation of CPU sub-system 106 to classify and/or drive indicator device 110.

Figure 2:
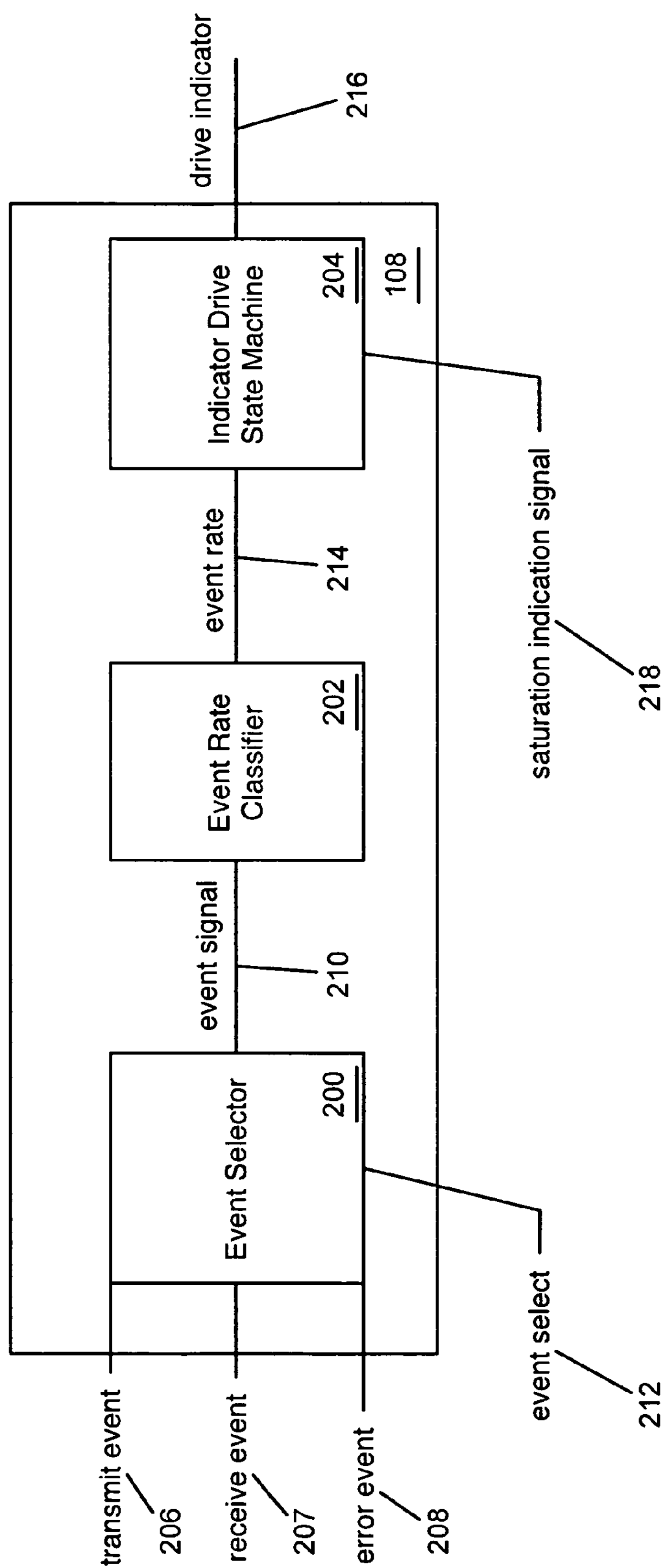
FIG. 2 is a block diagram of an event indicator sub-system of FIG. 1 of an embodiment.

FIG. 2 depicts a detailed block diagram of event indicator sub-system 108. Event indicator sub-system 108 includes an event selector 200, an event rate classifier 202, and an indicator drive state machine 204. Event selector 200 receives event signals from MAC sub-system 104 corresponding to specific events with respect to interaction with network 102, namely, a transmit event 206, a receive event 207, and an error event 208. For example, in a specific embodiment, transmit event 206 corresponds to an indication from an Ethernet media access controller (MAC) (corresponding to MAC sub-system 104) that a frame is being transmitted from network component 100 to network 102, receive event 207 corresponds to an indication from an Ethernet MAC that a frame is being received from network 102 by network component 100, and error event 208 corresponds to an indication from an Ethernet MAC that an error condition has occurred, such as a frame being too small or too large, a frame check sequence (FCS) error, a transmit underrun, etc. Event signals 206-208 are received directly from MAC sub-system 104 without processing by CPU sub-system 106. It will be understood that additional signal types may be monitored without departing from the intent of the present invention.

Event Selector

Event selector 200 generates an event signal 210 indicative of the receipt of an event signal 206-208 and transmits the event signal to event rate classifier 202. Generation of event signal 210 occurs based on a type of event selected to be generated by event selector 200 as determined by an event select signal 212 received by the event selector. That is, event selector 200 generates an event signal 210 corresponding to receipt of an event signal 206-208 matching the received event select signal 212. Put another way, event select signal 212 determines which one or more of received event signals 206-208 are used as the source for generating event signal 210. For example, event select signal 212 indicates one or more of events 206-208 as the source of the generation of event signal 210.

In one or more differing embodiments, event select signal 212 may indicate event signal 210 source as being transmit event signal 206 and receive event signal 207, alternately transmit event signal 206 and receive event signal 207, transmit event signal 206, receive event signal 207, and error event signal 208. In alternate embodiments, different combinations of event signals 206-208 may be used to cause generation of event signal 210. For example, in an embodiment, an average event signal time based on the receive event signal 207 time and transmit event signal 206 time during a predetermined sample period is used to generate event signal 210.

Event Rate Classifier

Event rate classifier 202 receives zero or more event signals 210 from event selector 200 for a predetermined sample period, classifies the activity level of the received event signals, and generates an event rate signal 214 for transmission to indicator drive state machine 204. Event rate classifier classifies the event signal 210 activity level (number of event signals received during the sample period) based on an event classification grouping at the end of each sample period. An embodiment includes the event classification grouping according to Table 1.

TABLE 1

| Grouping | Activity Level |
|---|---|
| Single Event | single event during the sample period |
| Low | sampled events are greater than single event, but less than or equal to 21% of the sample period |
| Medium Low | sampled events are approximately 22%-46% of the sample period |
| Medium High | sampled events are approximately 47%-67% of the sample period |
| High | sampled events are approximately 68%-81% of the sample period |
| Saturation | sampled events are above 81% of the sample period |
| Rate0 | no sampled events during the sample period |

It will be understood that different number of groupings and different percentages may be used in different embodiments. Advantageously, because percentage values are used to determine the particular activity level grouping, the speed of the network is taken into account and need not be provided as an input. That is, the slower the network, the longer the time required for a particular network event to occur, and vice versa. In this manner, the difference in the amount of utilization of the network capacity between different speed networks is accounted for. That is, a greater number of events are required on a higher speed network to attain the same activity level as a lesser number of events on a slower speed network.

The receive event 207 is driven high for the entire time MAC sub-system 104 is receiving an event, e.g., a frame. Likewise, the transmit event 206 is driven high for the entire time MAC sub-system 104 is transmitting an event, e.g., a frame. The error event 208 is driven high for the entire error event.

Based on the determined activity level and corresponding grouping from Table 1, event rate classifier 202 generates an event rate signal 214 including an indication of the applicable grouping for the sample period. Event rate classifier 202 transmits the event rate signal 214 to indicator drive state machine 204.

After receipt of an event rate signal 214 from event rate classifier 202, indicator drive state machine 204 generates a drive indicator signal 216 causing indicator device 110 to turn on for a specified ON time. After the specified ON time elapses, indicator drive state machine generates a drive indicator signal 216 causing indicator device 110 to turn off for a specified OFF time. In an embodiment, the ON time is 10 ms and the OFF time is determined based on the event rate signal 214 grouping indication.

In an embodiment, the OFF time is determined according to Table 2. The grouping of Table 2 corresponds to the grouping of Table 1.

TABLE 2

| Grouping | ON Time | OFF Time |
|---|---|---|
| Single Event | 10 ms | remainder of sample period |
| Low | 10 ms | 200-520 ms |
| Medium Low | 10 ms | 120-200 ms |
| Medium High | 10 ms | 80-120 ms |
| High | 10 ms | 20-60 ms |
| Saturation | 10 ms or entire sample period* | less than 20 ms |
| Rate0 | 0 ms | entire sample period |

With respect to the saturation grouping, in an embodiment note that the indicator is driven on for the entire sample period only if saturation indication signal 218 is asserted—driven high. Otherwise, the off time is less than 20 ms.

A pseudo random number generator (PRNG) (not shown) provides a random number used to determine the OFF time within the range specified in Table 2 above. In an embodiment, the OFF time is specified in 10 ms increments. For the Single Event and Rate0 grouping, the pseudo random number generator is not used for OFF time determination. However, the PRNG is not used for the saturation grouping if saturation indication signal 218 is driven high. In an alternate embodiment, a random number generator is used in place of the PRNG.

Indicator drive state machine 204 receives a saturation indication signal 218 causing the state machine to generate a drive indicator signal 216 to either: (1) turn on the indicator device 110 for a specified ON time and turn off the indicator device for a specified OFF time or (2) turn on the indicator device for a time period equal to the predetermined sample period without turning off the indicator device until the end of the period. In a particular embodiment, saturation signal 218 only affects indicator drive state machine 204 behavior when event rate classifier 202 selects the saturation grouping, as specified in Table 2. If the event rate 214 maps to the saturation grouping and saturation indication signal 218 is not driven high, drive indicator signal 216 has an on-time of 10 ms and off-time of less than 20 ms. If the event rate 214 maps to the saturation grouping and the saturation indication signal 218 is driven high, the drive indicator signal 216 is driven on for the entire sample period.

In an embodiment, CPU sub-system 106 transmits saturation indication signal 218 and event select signal 212 to event indicator sub-system 108 to control operation of the event indicator sub-system.

EXAMPLE

An example is now provided to describe operation of an embodiment according to the present invention. Network traffic flows into and out of network component 100 via network 102. MAC sub-system 104 in conjunction with CPU sub-system 106 receives and transmits network traffic with network 102. For each network traffic transmission from MAC sub-system 104, the MAC sub-system transmits an event signal 206 to event indicator sub-system 108. For each network traffic reception by MAC sub-system 104, the MAC sub-system transmits a receive event signal 207 to event indicator sub-system 108. For each network traffic error detected by MAC sub-system 104, the MAC sub-system transmits an error event signal 208 to event indicator sub-system 108.

Assuming event selector 200 has previously received an event select signal 212 requesting indication of the activity level of transmissions on network 102, event selector 200 generates an event signal 210 based on each received transmit event signal 206 from MAC sub-system 104. Event selector 200 transmits each event signal 210 to event rate classifier 202. Alternate embodiments selecting and transmitting an event signal 210 based on reception of receive event signal 207 and error event signal 208 are also contemplated and achieved similarly to transmit event signal 206 described above.

In another embodiment, assuming event selector 200 has previously received an event select signal 212 requesting indication of the activity level of transmissions and receptions on network 102, the event selector generates an event signal 210 based on each received transmit event signal 206 and receive event signal 207 from MAC sub-system 104. Event selector 200 transmits each event signal 210 to event rate classifier 202.

At the end of the predetermined sample period, event rate classifier 202 determines the percentage of the predetermined sample period during which zero or more event signals 210 are received from event selector 200. For example, if the combined time period of one or more event signals 210 received by event rate classifier 202 totals 200 ms out of a 400 ms sample period, then the activity level falls within the range specified by grouping Medium High, according to Table 1 (50% of the sample period). In another situation, if the combined time period of one or more event signals 210 received by event rate classifier 202 totals 20 ms out of a 400 ms sample period, then the activity level falls within the range specified by grouping Low, according to Table 1 (5% of the sample period).

After determining the grouping of the activity level for the sample period, event rate classifier generates an event rate signal 214 indicating the grouping for the sample period and transmits the signal to indicator drive state machine 204. Upon receipt of event rate signal 214, indicator drive state machine 204 generates drive indicator signal 216 and drives indicator device 110 for the specified ON and OFF times, according to Table 2. For example, based on receipt of an event rate signal 214 indicating a Medium High grouping, indicator drive state machine 204 generates drive indicator signal 216 turning on indicator device 110 for 10 ms followed by turning off the indicator device for an 80-120 ms period determined by the output of the pseudo random number generator. Following the off time period, indicator drive state machine 204 again generates drive indicator signal 216 turning on indicator device 110 for another 10 ms followed by turning off the indicator device for the determined off period described above.

Indicator drive state machine 204 generates drive indicator signal 216 as described above for the entirety of the predetermined sample period. That is, the indicator drive state machine 204 turns the indicator device 110 on and off based on the event rate signal 214 for the sample period. Upon receipt of a new event rate signal 214, indicator drive state machine 204 determines the on and off periods based on the indicated grouping of the activity level.

Advantageously, an embodiment according to the present invention does not require polling or querying of MAC sub-system 104. Further, interaction with CPU sub-system 106 is not required. Additionally, single event occurrences are represented without incurring saturation of indicator device 110 at relatively low traffic levels. For example, recurring events causing 0.0164% utilization of a 1,000 Mb/s network link do not cause indicator device 110 to illuminate continuously.

It will be readily seen by one of ordinary skill in the art that the embodiments fulfills one or more of the advantages set forth above. After reading the foregoing specification, one of ordinary skill will be able to affect various changes, substitutions of equivalents and various other aspects of the embodiments as broadly disclosed herein. It is therefore intended that the protection granted hereon be limited only by the definition contained in the appended claims and equivalents thereof.

What is claimed is:

1. A network event indicator system, comprising:

an event rate classifier configured to receive an event signal representing timing of a network event during a predetermined sample period and to transmit an event rate signal, wherein the event rate signal is generated by the event rate classifier and represents a percentage of a number of event signals received during the sample period; and an indicator drive state machine connected to the event rate classifier, the indicator drive state machine comprising an event rate signal receiver configured to receive the event rate signal and a drive indicator signal generator configured to generate a drive indicator signal based on the received event rate signal.

2. The system of claim 1, further comprising:

an event selector configured to select an event type as a basis which is used to generate the event signal input to the event rate classifier.

3. The system of claim 2, wherein the event type includes a transmit event, a receive event, and an error event.

4. The system of claim 1, wherein the indicator drive state machine is adapted to receive a saturation indication signal.

5. The system of claim 4, wherein indicator drive state machine generates a turn on drive indicator signal for the entire predetermined sample period responsive to the saturation indication signal.

6. The system of claim 1, the indicator drive state machine comprising:

a random number generator, and wherein the indicator drive state machine generates the drive indicator signal responsive to the received event rate indicator and the random number generator.

7. The system of claim 1, wherein the event signal representing the timing of the network event during the predetermined sample period comprises information regarding a number of occurrences of the network event during the predetermined sample period and the event rate classifier is configured to generate the event rate signal using the number of occurrences of the network event during the predetermined sample period.

8. The system of claim 7, wherein the event rate classifier and indicator drive state machine comprise components of a network component, and the predetermined sample period comprises only a portion of time of communications via the network component.

9. A method of indicating network events, comprising the steps of:

receiving an event signal on an event rate classifier, the signal representing timing of a network event during a predetermined sample period;

generating an event rate signal based on a percentage of received event signals, wherein the event rate signal is determined based on a relationship between the event signal timing and the predetermined sample period; and generating an indicator signal using an indicator drive state machine signal generator connected to the event rate classifier, wherein the indicator signal is based on the event rate signal.

10. The method of claim 9, further comprising the step of:

receiving an event select signal indicating an event type to be used to generate the event rate signal.

11. The method of claim 10, wherein the event type includes a transmit event, a receive event, and an error event.

12. The method of claim 9, further comprising the step of:

receiving a saturation indication signal indicating generation of a type of an indicator signal representing saturation at a particular network event activity level.

13. The method of claim 9, wherein the indicator signal is generated based on the event rate signal and a random number.

14. The method of claim 9, wherein the receiving comprises receiving the event signal which comprises information regarding a number of occurrences of the network event during the predetermined sample period, and the generating the event rate signal based on the received event signal comprises generating the event rate signal using the number of occurrences of the network event during the predetermined sample period.

15. A network event indicator system comprising:

an indicator configured to generate a plurality of signals indicative of numbers of occurrences of a network events upon a network; and circuitry configured to determine occurrences of network events during a sampling period of time during communications via the network, to select at least one of the signals as a source for generating an event signal for the network events during the sampling period of time, and to control the indicator to generate the event signal after the selection to indicate the source of the generation of the event signal.

16. The system of claim 15, wherein the circuitry comprises:

classifier circuitry configured to determine the number of occurrences of network events during the sampling period of time and to identify one of a plurality of activity levels which corresponds to a percentage of the determined number of occurrences of the network event during the sampling period of time; and driver circuitry coupled with the classifier circuitry and the indicator and configured to receive the identified one of the activity levels and to control the indicator to generate the one of the signals as result of the reception of the identified one of the activity levels.

17. The system of claim 16, wherein the classifier circuitry is configured to use predetermined associations of different numbers of occurrences of the network event during the sampling period of time with different ones of the activity levels to identify the one of the activity levels and the driver circuitry is configured to use predetermined associations of different ones of the activity levels with the signals to select the one of the signals.

18. The system of claim 15, wherein the circuitry and indicator comprise components of a network component configured to communicate via the network, and the sampling period of time comprises only a portion of an amount of time of communications via the network component.

19. The system of claim 15, wherein the circuitry and indicator comprise components of a network component configured to communicate via the network, and the network events individually correspond to data communicated between the network component and the network.

20. The system of claim 19, wherein the sampling period of time comprises only a portion of an amount of time of communications via the network component.

* * * * *

UNITED STATES PATENT AND TRADEMARK OFFICE

CERTIFICATE OF CORRECTION

PATENT NO. : 8,549,134 B1
APPLICATION NO. : 11/055593
DATED : October 1, 2013
INVENTOR(S) : Mark Gravel et al.

It is certified that error appears in the above-identified patent and that said Letters Patent is hereby corrected as shown below:

In the Claims:

In column 8, line 45, in Claim 15, delete "of a" and insert -- of --, therefor.

Signed and Sealed this
Seventh Day of January, 2014

Margaret A. Focarino
*Commissioner for Patents of the United States Patent and Trademark Office*